United States Patent
Danilak (10) Patent No.: US 8,356,142 B1
(45) Date of Patent: Jan. 15, 2013

(54) MEMORY CONTROLLER FOR NON-SEQUENTIALLY PREFETCHING DATA FOR A PROCESSOR OF A COMPUTER SYSTEM

(75) Inventor: Radoslav Danilak, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 1044 days.

(21) Appl. No.: 10/712,520

(22) Filed: Nov. 12, 2003

(51) Int. Cl.
G06F 12/10 (2006.01)
G06F 12/12 (2006.01)

(52) U.S. Cl. .......................................... 711/137; 711/133

(58) Field of Classification Search ........................ None
See application file for complete search history.

(56) References Cited

U.S. PATENT DOCUMENTS

| | | | |
|---|---|---|---|
| 5,455,913 A | 10/1995 | Shrock et al. | |
| 5,546,548 A | 8/1996 | Chen et al. | |
| 5,649,230 A | 7/1997 | Lentz | |
| 5,717,954 A | 2/1998 | Grieff et al. | |
| 5,761,468 A | 6/1998 | Emberson | |
| 5,768,548 A | 6/1998 | Young et al. | |
| 5,790,817 A | 8/1998 | Asghar et al. | |
| 5,822,568 A | 10/1998 | Swanstrom | |
| 5,864,876 A | 1/1999 | Rossum et al. | |
| 5,881,248 A | 3/1999 | Mergard | |
| 5,923,859 A | 7/1999 | Melo et al. | |
| 5,940,866 A | 8/1999 | Chisholm et al. | |
| 5,968,143 A | 10/1999 | Chisholm et al. | |
| 6,016,528 A | 1/2000 | Jaramillo et al. | |
| 6,018,803 A | 1/2000 | Kardach | |
| 6,029,223 A | 2/2000 | Klein | |
| 6,029,228 A * | 2/2000 | Cai et al. | 711/137 |
| 6,085,276 A | 7/2000 | VanDoren et al. | |
| 6,085,278 A | 7/2000 | Gates et al. | |
| 6,098,114 A | 8/2000 | McDonald et al. | |
| 6,101,568 A * | 8/2000 | Richardson | 710/310 |
| 6,157,980 A * | 12/2000 | Arimilli et al. | 711/3 |
| 6,175,634 B1 | 1/2001 | Graumann | |
| 6,182,112 B1 | 1/2001 | Malek et al. | |
| 6,185,634 B1 | 2/2001 | Wilcox | |
| 6,205,524 B1 | 3/2001 | Ng | |
| 6,226,695 B1 | 5/2001 | Kaiser et al. | |
| 6,233,656 B1 | 5/2001 | Jones et al. | |
| 6,266,742 B1 * | 7/2001 | Challenger et al. | 711/133 |
| 6,298,407 B1 | 10/2001 | Davis et al. | |

(Continued)

OTHER PUBLICATIONS

Jason Fritts, "Multi-Level Memory Prefetching for media and Stream Processing", Proceedings, 2002 IEEE International Conference on Multimedia and Expo, 2002, ICME '02. vol. 2 Aug. 26-29, 2002, pp. 101-104 vol. 2.

(Continued)

*Primary Examiner* — Duc T Doan (57) ABSTRACT

A memory controller for non-sequentially prefetching data for a processor of a computer system. The memory controller performs a method including the step of storing a plurality of address pairs in a table data structure, wherein the address pairs include a first address and a second address. The first address and the second address are non-sequential as fetched by a processor of a computer system. The address pairs are prioritized in accordance with a frequency of use for each of the address pairs. A system memory of the computer system is accessed and a plurality of cache lines corresponding to the address pairs are stored in a prefetch cache. Upon a cache hit during a subsequent access by the processor, data is transferred from the cache lines stored in the prefetch cache to the processor.

22 Claims, 8 Drawing Sheets

U.S. PATENT DOCUMENTS

| | | | |
|---|---|---|---|
| 6,314,472 B1 | 11/2001 | Trieu et al. | |
| 6,345,341 B1 | 2/2002 | Arimilli et al. | |
| 6,397,296 B1 | 5/2002 | Werner | |
| 6,418,496 B2 | 7/2002 | Pawlowski et al. | |
| 6,442,634 B2 | 8/2002 | Bronson et al. | |
| 6,480,939 B2 | 11/2002 | Anderson et al. | |
| 6,526,518 B1 | 2/2003 | Catlin et al. | |
| 6,560,657 B1 | 5/2003 | Gandhi et al. | |
| 6,571,318 B1* | 5/2003 | Sander et al. | 711/137 |
| 6,574,712 B1 | 6/2003 | Kahle et al. | |
| 6,578,102 B1* | 6/2003 | Batchelor et al. | 710/310 |
| 6,631,434 B1 | 10/2003 | Johnson et al. | |
| 6,681,281 B1 | 1/2004 | Maleck | |
| 6,681,285 B1 | 1/2004 | Ng | |
| 6,696,854 B2 | 2/2004 | Momtaz et al. | |
| 6,696,954 B2 | 2/2004 | Chung | |
| 6,745,258 B1 | 6/2004 | Pellegrino et al. | |
| 6,751,038 B1 | 6/2004 | Wada | |
| 6,754,755 B1 | 6/2004 | Johnson et al. | |
| 6,782,457 B2* | 8/2004 | Hill et al. | 711/158 |
| 6,801,963 B2 | 10/2004 | Bissessur et al. | |
| 6,842,803 B2 | 1/2005 | Schmidt et al. | |
| 6,877,048 B2 | 4/2005 | Bilak et al. | |
| 6,898,649 B2 | 5/2005 | Goudie | |
| 6,901,467 B2 | 5/2005 | Shah et al. | |
| 6,904,473 B1 | 6/2005 | Bloxham et al. | |
| 6,907,480 B2 | 6/2005 | Takei et al. | |
| 6,910,106 B2* | 6/2005 | Sechrest et al. | 711/136 |
| 6,915,363 B2 | 7/2005 | Wood et al. | |
| 6,950,892 B2 | 9/2005 | Bell, Jr. et al. | |
| 6,957,290 B1 | 10/2005 | Rowlands et al. | |
| 6,996,684 B2 | 2/2006 | Tseng et al. | |
| 6,999,426 B2 | 2/2006 | Miyoshi | |
| 7,032,046 B2 | 4/2006 | Horii et al. | |
| 7,096,291 B2 | 8/2006 | Lin | |
| 7,124,232 B2 | 10/2006 | Takeda et al. | |
| 7,139,878 B2 | 11/2006 | Malik et al. | |
| 7,143,219 B1 | 11/2006 | Chaudhari et al. | |
| 7,177,985 B1 | 2/2007 | Diefendorff | |
| 7,263,566 B2 | 8/2007 | Ganasan et al. | |
| 7,376,846 B2 | 5/2008 | Hawkins et al. | |
| 7,389,466 B1 | 6/2008 | Harmer et al. | |
| 7,505,461 B2 | 3/2009 | Matsuda et al. | |
| 7,525,986 B2 | 4/2009 | Lee et al. | |
| 7,600,058 B1 | 10/2009 | Danilak | |
| 7,706,756 B2 | 4/2010 | Sato et al. | |
| 7,895,385 B2 | 2/2011 | Raju | |
| 2001/0001873 A1* | 5/2001 | Wickeraad et al. | 711/136 |
| 2001/0014928 A1* | 8/2001 | Chrysos et al. | 710/244 |
| 2002/0023204 A1* | 2/2002 | Barowski et al. | 712/239 |
| 2002/0056027 A1 | 5/2002 | Kanai et al. | |
| 2002/0144054 A1 | 10/2002 | Fanning et al. | |
| 2003/0126355 A1 | 7/2003 | David | |
| 2003/0191880 A1 | 10/2003 | Lin | |
| 2003/0229743 A1 | 12/2003 | Brown | |
| 2003/0229762 A1 | 12/2003 | Maiyuran et al. | |
| 2004/0024947 A1 | 2/2004 | Barth et al. | |
| 2004/0024948 A1 | 2/2004 | Winkler et al. | |
| 2004/0049641 A1 | 3/2004 | So et al. | |
| 2004/0064649 A1 | 4/2004 | Volpe et al. | |
| 2004/0083341 A1* | 4/2004 | Robinson et al. | 711/133 |
| 2004/0088458 A1 | 5/2004 | Tomlinson et al. | |
| 2004/0117606 A1* | 6/2004 | Wang et al. | 712/235 |
| 2004/0123043 A1 | 6/2004 | Rotithor et al. | |
| 2004/0201647 A1 | 10/2004 | Jackson Pulver et al. | |
| 2005/0081014 A1 | 4/2005 | Tran et al. | |
| 2005/0138254 A1 | 6/2005 | Raghavan et al. | |
| 2005/0216607 A1 | 9/2005 | Munguia | |
| 2006/0041721 A1 | 2/2006 | Hakura et al. | |
| 2006/0041722 A1 | 2/2006 | Hakura et al. | |
| 2006/0041723 A1 | 2/2006 | Hakura et al. | |
| 2006/0095677 A1 | 5/2006 | Hakura et al. | |
| 2007/0198758 A1 | 8/2007 | Asano et al. | |
| 2009/0055566 A1 | 2/2009 | Reinig et al. | |
| 2009/0089477 A1 | 4/2009 | Reed | |
| 2009/0228631 A1 | 9/2009 | Marulkar et al. | |
| 2010/0057973 A1 | 3/2010 | Barake et al. | |

OTHER PUBLICATIONS

Jason Carter, et al., "Impulse: Building a Smarter Memory Controller", Proceedings, Fifthe International Symposium on High-Performance Compter Architecture, 9-13, Jan. 1999; pp. 70-79.

"Using Spin-Loops on Intel Pentium 4 Processor and Intel Xeon Processor"; Version 2.1; May 2001. Order No. 248674-002. Retrieved from http://cache-www.intel.com/cd/00/00/01/17689_w_spinlock.pdf on Mar. 4, 2006.

Jouppi, N. P.; "Improving Direct-Mapped Cache Performance by the Addition of a Small Fully-Associative Cache and Prefetch Buffers"; Proceedings, 17th Annual International Symposium on Computer Architecture, 1990, May 28-31, 1990 pp. 364-373.

Brandt, Scott, "Module 2: Computer-System Structure" Spring 2001, http://www/spe/icsc/edi/-sbrandt/courses/Spring01/111/slides/mod2.1.pdf.

Non-Final Office Action Dated Mar. 21, 2006; U.S. Appl. No. 10/674,618.

Non-Final Office Action Dated Oct. 18, 2006; U.S. Appl. No. 10/674,618.

Non-Final Office Action Dated Aug. 10, 2007; U.S. Appl. No. 10/674,618.

Final Office Action Dated May 16, 2008; U.S. Appl. No. 10/674,618.

Non-Final Office Action Dated Oct. 7, 2008; U.S. Appl. No. 10/674,618.

Non-Final Office Action Dated Jul. 7, 2009; U.S. Appl. No. 10/674,618.

Final Office Action dated Feb. 16, 2010; U.S. Appl. No. 10/674,618.

Final Office Action, U.S. Appl. No. 10/674,618, dated Oct. 13, 2009.

Non-Final Office Action Mailed Apr. 4, 2011; U.S. Appl. No. 10/674,618.

Final Office Action Mailed Oct. 13, 2010; U.S. Appl. No. 10/674,618.

"Battery Charging Specification", "USB Implementers Forum, Inc.", Dated: Mar. 8, 2007, pp. 1-29, Revision 1.0.

"Device Class Specification Adopters Agreement", Downloaded Circa: Mar. 10, 2007, pp. 1-5.

* cited by examiner

|  | leg table 129 |  |
| --- | --- | --- |
| legs 501 | confidence 502 | priority 503 |
| leg XX | XX | XX |
| leg XX | XX | XX |
| leg XX | XX | XX |
| leg XX | XX | XX |

510 — (row 1)
511 — (row 2)
512 — (row 3)
520 — (row 4)

MEMORY CONTROLLER FOR NON-SEQUENTIALLY PREFETCHING DATA FOR A PROCESSOR OF A COMPUTER SYSTEM

This application is related to commonly assigned US patent application "A MEMORY CONTROLLER FOR SEQUENTIALLY PREFETCHING DATA FOR A PROCESSOR OF A COMPUTER SYSTEM", by Radoslav Danilak, Ser. No. 10/674,618, filed on, Sep. 29, 2003, which is incorporated herein in its entirety.

FIELD OF THE INVENTION

The field of the present invention relates to digital computer systems. More particularly, the present invention relates processor data access to system memory.

BACKGROUND OF THE INVENTION

A primary factor in the utility of a computer system is its speed in executing application programs. A high-performance computer system is expected to be responsive to user inputs and to accurately provide processed results within real-time constraints. A primary factor in the speed and responsiveness of a computer system is the efficiency of its processor. Accordingly, an enormous amount of investment has been placed into the development of very high-speed processors.

It is important to provide software instructions and data to a processor (e.g., central processing unit, or CPU) at least as fast as the rate at which to CPU processes such instructions and data. Failure to provide the needed instructions/data results and the CPU idling as it waits for instructions. Modern integrated circuit fabrication technology has enabled the production of CPUs that function at extremely high speeds (e.g., 3 gigahertz and above). Consequently, it has become very challenging for system designers to ensure that the needed instructions/data are provided to a modern high-speed CPU from the system memory without imposing substantial CPU idle time penalties.

A widely used solution for reducing CPU idle time penalties involves the incorporation of highly optimized memory caches within the CPU die. In general, a memory cache is used to speed-up data transfer and may be either temporary or permanent. Memory caches are well known and widely used to speed-up instruction execution and data retrieval. These temporary caches serve as staging areas, and are optimized to reduce data access latency in comparison to system memory.

In a typical computer system implementation, a memory cache functions as a low latency storage area that bridges main memory and the CPU. Modern CPUs typically include two specialized memory caches; a level one cache and a level two cache. A level one (L1) cache is a very high-speed memory bank built into the CPU die. The L1 cache is typically located directly within the CPU die (fabricated using the same highly optimized semiconductor fabrication process as the CPU) and is therefore much faster than main memory. A level two cache (L2) is a secondary staging area that feeds the L1 cache. The L2 cache is generally not as fast as the L1 cache. Because the circuitry of the L2 cache is less complex in comparison to the L1 cache, the L2 cache is usually larger. The L2 cache may be built into the CPU chip, may reside on a separate chip in a multichip package module, or may be a separate bank of chips. The objective of both the L1 and the L2 caches is to keep staging more instructions and data in high-speed memory closer to the CPU.

Instructions and data are transferred from main memory to the cache in blocks. These blocks are usually referred to as cache lines, and usually represent the smallest unit of memory that can be transferred between the main memory and the cache. To increase efficiency, when data needs to be transferred from main memory to the cache (e.g., L1 cache or L2 cache), a number of cache lines are transferred at once. Typically, some kind of look-ahead sequence is used to fetch the desired cache line plus a number of additional cache lines. The more sequential the instructions in the routine being executed or the more sequential the data being read, the greater chance the next required item will already be in the cache, thereby resulting in better performance. This technique is referred to as prefetching.

A problem exists however, in that even with the implementation of L1 and L2 caches, on many occasions, high-speed CPUs are still starved of data and are forced to idle while needed data is fetched. Prior art solutions to this problem have involved increasing the size of the caches, increasing the speed of the system memory, increasing the bandwidth of the system memory bus, and the like. These prior art solutions have not proven entirely successful. For example, increasing the size of the caches of the CPU has a very significant impact on the overall cost of the CPU. A larger cache leads to larger CPU die size, and a correspondingly more expensive CPU chip. Increasing the system memory speed also impacts cost in that high-performance memory (e.g., DDR chips, RDRAM chips, etc.) is expensive and can be in short supply. Increasing the bandwidth of the system-memory bus impacts the architecture of the overall computer system in that the support chips which interface the CPU to the other components of the computer system may also need to be redesigned to function properly with higher bus speeds/bus widths.

Another prior art solution, utilized in computer systems implementing a Northbridge/Southbridge chip set architecture, involves placing an additional cache within the Northbridge of the computer system's chip set. The Northbridge typically functions as the memory controller for the CPU, interfacing data reads/writes from the CPU with the system memory. System designers have incorporated a small cache within the Northbridge (e.g., less than 2 kB) in an attempt to alleviate the CPU data starvation problem. This solution has not proven successful since the size of the cache in the Northbridge is typically much smaller than the L1 and L2 caches of the CPU. An additional problem is the fact that the accesses to the system memory by the Northbridge cache and by the CPU are basically uncoordinated, leading to bandwidth contention, duplication, and similar problems.

SUMMARY OF THE INVENTION

Thus, what is required is a solution that can significantly reduce CPU data starvation idle time. The required solution should be able to significantly reduce the amount of idle time latency the CPU undergoes while waiting for needed data. The required solution should provide reduced idle time benefits without imposing significant cost impacts on the CPU, the system memory, or the memory bus architecture.

Embodiments of the present invention comprise a memory controller for non-sequentially prefetching data for the processor (e.g., CPU) of a computer system. Embodiments of the present invention provide a solution that can significantly alleviate CPU data starvation idle time. Additionally, embodiments of the present invention provide reduced CPU idle time benefits without imposing significant cost impacts on the CPU, the system memory, or the memory bus architecture.

In one embodiment, the present invention is implemented as a memory controller for non-sequentially prefetching data for a processor of a computer system. The memory controller stores a plurality of address pairs in a table data structure, wherein the address pairs include a first address and a second address. The first address and the second address are non-sequential as fetched by a processor of a computer system. The address pairs are prioritized in accordance with a frequency of use for each of the address pairs. A system memory of the computer system is accessed and a plurality of cache lines corresponding to the address pairs are stored in a prefetch cache. Upon a cache hit during a subsequent access by the processor, data is transferred from the cache lines stored in the prefetch cache to the processor as opposed to being transferred from the higher latency system memory.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Embodiments of the present invention comprise a memory controller for non-sequentially prefetching data for the processor, e.g., a CPU, of a computer system. Embodiments of the present invention provide a solution that can significantly alleviate CPU data starvation idle time. Additionally, embodiments of the present invention provide reduced CPU idle time benefits without imposing significant cost impacts on the CPU, the system memory, or the memory bus architecture. Embodiments of the present invention and their benefits are further described below.

Figure 1:
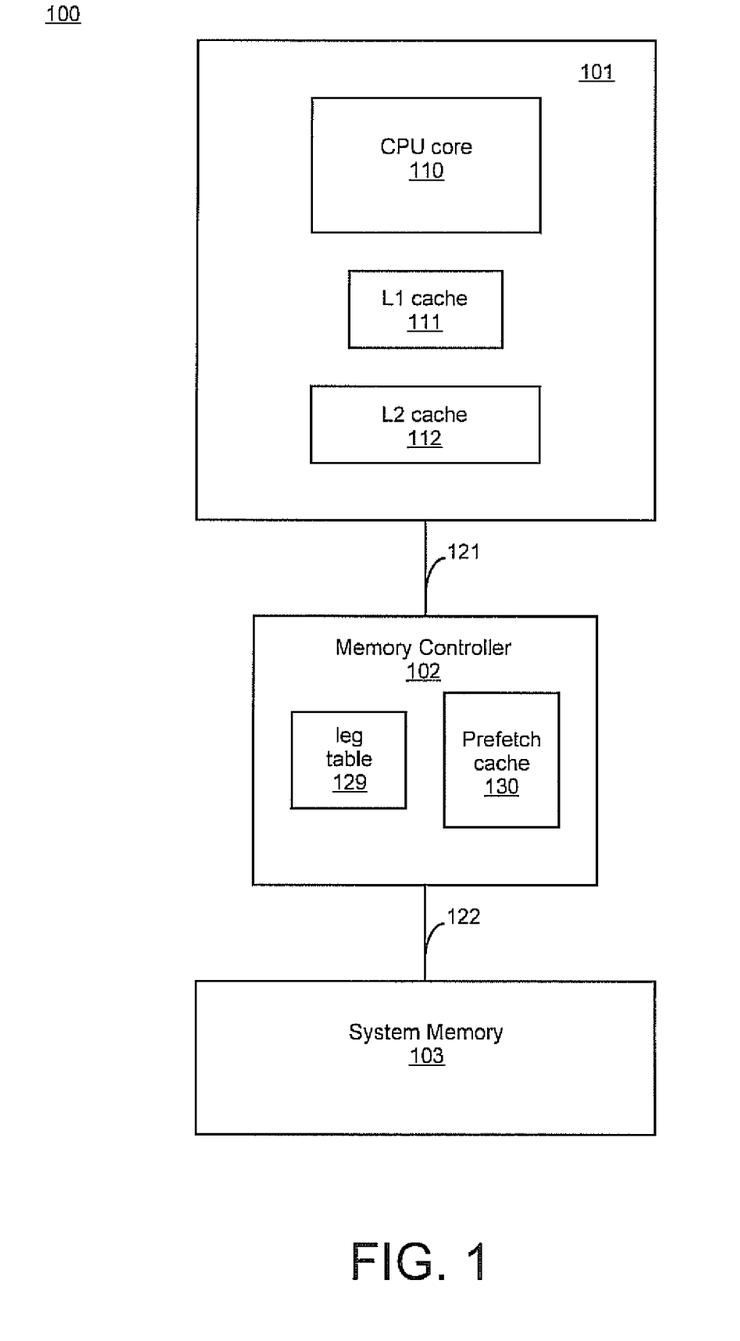
FIG. 1 shows a general diagram of a computer system in accordance with one embodiment of the present invention.

FIG. 1 shows a diagram depicting a computer system 100 showing the basic components of a computer system platform that may be used to implement the functionality of an embodiment of the present invention. Accordingly, system 100 can be implemented as, for example, a desktop computer system, a game console, or server computer system, etc., having a general-purpose CPU 101 coupled to system memory 103 via a memory controller 102. In such an embodiment, components can be included that are designed to add peripheral buses, specialized graphics functions and graphics memory, IO devices, and the like. Accordingly, computer system 100 can function as the basic computer system platform for a desktop or server computer system, or for a set-top gaming device such as, for example, as an X-Box™ or similar gaming device or console. Additionally, it should be noted that the term CPU (e.g., CPU 101) is used herein generally, and thus can be implemented as a number of different types of processors for a number of different types of computer system devices, such as, for example, an embedded processor, a graphics processor (e.g., specialized for performing graphics computations), a multiprocessor subsystem, and the like.

In the system 100 embodiment, the CPU 101 includes a CPU core 110 that is configured to access data from an L1 cache 111 and an L2 cache 112. The CPU core 110 of the CPU 101 is also configured to access system memory 103 via the memory controller 102. The memory controller 102 is connected to the CPU 101 by a front side bus 121 and is connected to the system memory 103 by a system memory bus 122. The memory controller 102 includes a prefetch cache 130.

In the system 100 embodiment, the prefetch cache 130 is loaded with cache lines retrieved from the system memory 103 in order to reduce the latency experienced by the CPU 101. CPU access to cache lines stored within the prefetch cache 130 is much faster than accessing cache lines within the system memory 103. Accordingly, an objective of embodiments of the present invention is to make intelligent decisions regarding which cache lines are retrieved from the system memory 103 and stored in the prefetch cache 130.

The leg table 129 within the memory controller 102 provides a mechanism by which the system 100 embodiment decides which cache lines are stored into the prefetch cache 130. The CPU 101 transfers data to and from the system memory 103 by initiating data transactions with the memory controller across a front side bus 121. In many cases, the CPU accesses (e.g., to the cache lines stored within the system memory 103) occur sequentially, with successive cache lines being fetched by the CPU 101 as, for example, an instruction pointer proceeds through an application. In other cases, CPU 101 access to system memory 103 is discontinuous, or non-sequential, such as, for example, when the CPU 101 arrives at a branch point in an application. The discontinuity leads to a jump from one address to another.

Embodiments of the present invention take advantage of the observation that such discontinuous, or non-sequential, accesses often occur in patterns. The patterns of the non-sequential address accesses are closely related to the underlying software code executed by the CPU 101. Embodiments of the present invention utilize a table data structure, the leg table 129, to track the non-sequential address accesses and make intelligent decisions as to which cache lines should be retrieved from the system memory 103 and stored within the prefetch cache 130. In so doing, embodiments of the present invention take advantage of the fact that branch points (e.g., conditional moves, conditional jumps, and the like) of a typical application usually jump to and from regular address pairs. By recording these address pairs and properly ranking them, the destination cache lines can be predictively prefetched from the system memory 103 and stored in the prefetch cache 130, thereby significantly reducing the overall latency experienced by the CPU 101.

In the system 100 embodiment, both the prefetch cache 130 and the leg table 129 are included within the memory controller 102. The memory controller 102 functions by interfacing the CPU 101 to system memory 103 via a system memory bus 122 and the front side bus 121. The prefetch cache 130 is configured to access system memory 103 to retrieve and store a plurality of cache lines when CPU 101 is not accessing the system memory 103. This is in order to ensure the memory controller 102 is not contending with the CPU 101 for bandwidth on the system memory bus 122. In other words, data is prefetched into the prefetch cache 130 only when the system memory bus 122 is idle.

In one embodiment, if a data prefetch is underway for the prefetch cache 130 and the memory controller 102 receives an indication that the CPU 101 wants to access the system memory 103, the data prefetch can be interrupted to allow the CPU 101 to carry out its data access, and subsequently resumed once the data access is complete.

Figure 2:
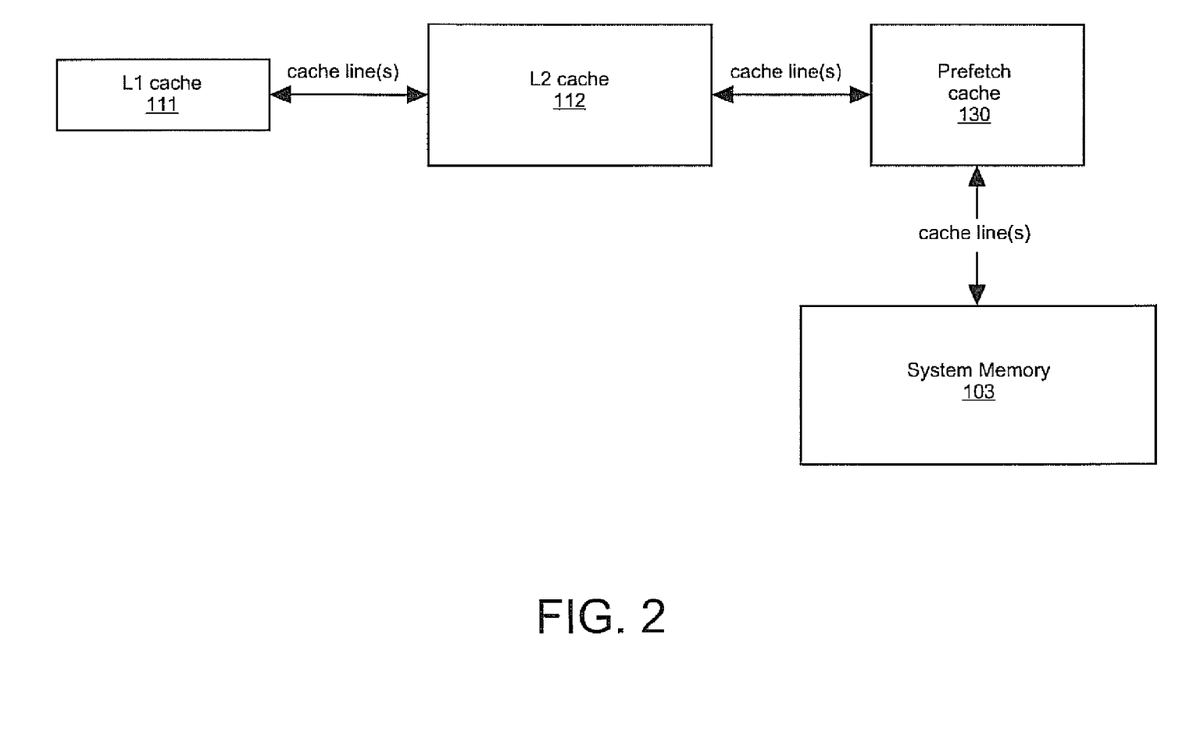
FIG. 2 shows a diagram showing the relationship between the L1 cache and the L2 cache with respect to the prefetch cache and the system memory of a computer system in accordance with one embodiment of the present invention.

FIG. 2 shows a diagram illustrating the relationship between the L1 cache 111 and the L2 cache 112 with respect to the prefetch cache 130 and the system memory 103 in accordance with one embodiment of the present invention. As depicted in FIG. 2, data is transferred between the caches as one or more cache lines.

As known by those skilled in the art, modern CPUs primarily process data and instructions from their caches (e.g., L1 cache 111 and L2 cache 112). When needed data is not available in the on-chip caches, e.g., when a cache miss occurs, that data is transferred from system memory. These transfers occur in large blocks of data, commonly referred to as cache lines (e.g., due to the fact that the blocks are transferred in a manner to refill the CPU's L1 and/or L2 caches). For example, rather than reading a single word or byte from main memory at a time, an entire block of memory, containing a certain number of bytes (e.g., a cache line) is read and cached at once. This takes advantage of the principle of locality of reference, in that if one location is read then nearby locations are likely to be read soon afterwards. This is particularly true for sequentially following locations. In addition, reading entire cache lines at once can also take advantage of page-mode DRAM which allows faster access to consecutive locations. This relationship as depicted in FIG. 2, where cache line(s) are shown undergoing a transfer between the caches 111-112, the prefetch cache 130, and the system memory 103. In contrast, in the event of a branch in program execution, non-sequential cache lines are fetched by the CPU 101, where the CPU 101 jumps to a new target address from a current address. Once the cache line for the new target address has been fetched, the CPU 101 may prefetch additional cache lines sequentially.

Embodiments of the present invention provide benefits wherein cache lines of data are made available to the CPU 101 in the prefetch cache 130. This data has a much lower latency than data stored in the system memory 103. For example, for a typical CPU 101, the access latency for the L1 cache 111 is on the order of four to five nanoseconds, while the latency for the L2 cache 112 is on the order of 10 to 12 nanoseconds. In contrast, the latency for system memory 103 is on the order of 50 to 60 nanoseconds. Data stored in the prefetch cache 130 has latency much lower than the system memory 103 (e.g., 15 to 25 nanoseconds).

Figure 3:
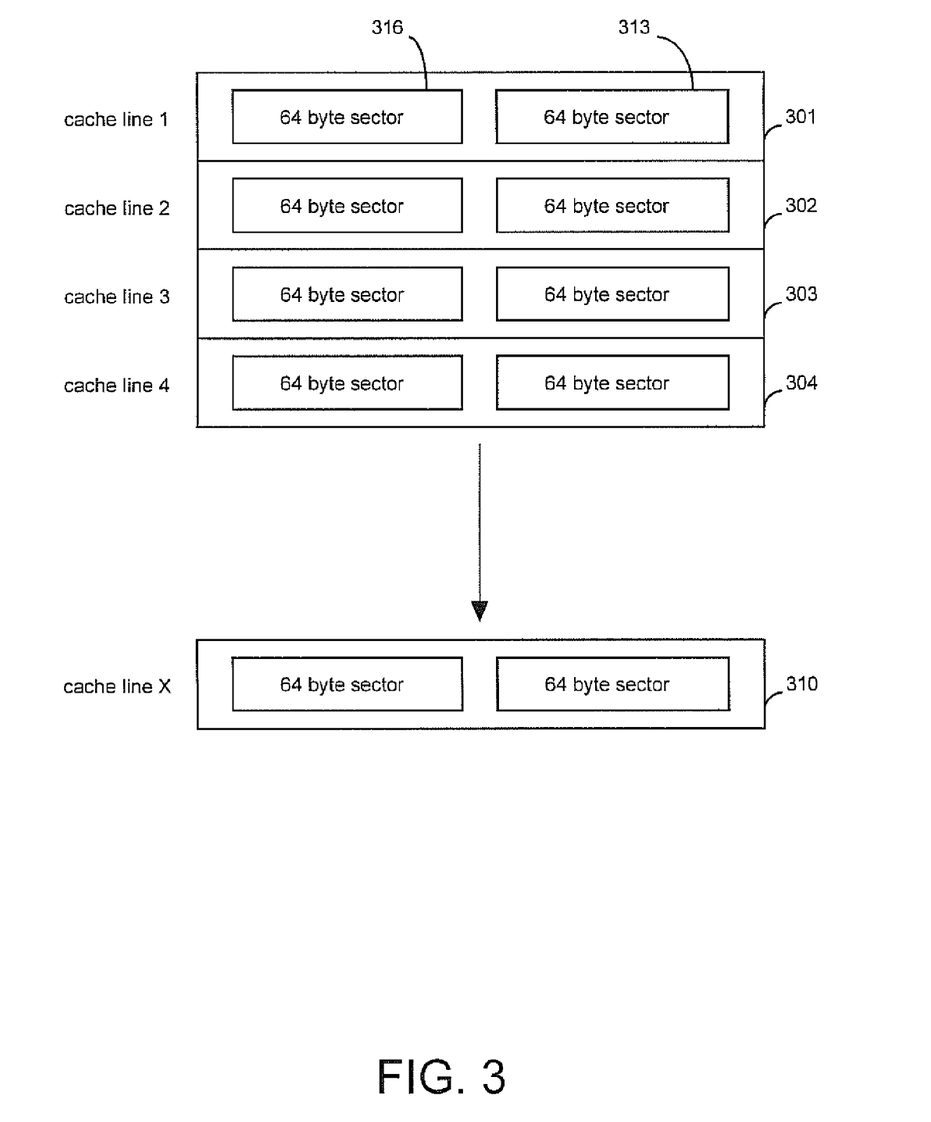
FIG. 3 shows a plurality of cache lines as used by a first CPU in accordance with one embodiment of the present invention.

FIG. 3 shows a plurality of cache lines as used by a first CPU in accordance with one embodiment of the present invention. As depicted in FIG. 3, cache lines 301-310 are shown (e.g., cache line 1 through cache line x). As known by those skilled in the art, there are a number of different CPU architectures that are present in the marketplace. In the architecture depicted in FIG. 3, a cache line comprises a 128 byte block of data. This block of data is divided into two 64 byte sectors; an upper sector (e.g., sector 315) and a lower sector (e.g., sector 316). In a sequential access, when the CPU (e.g., CPU 101) experiences a cache miss in its onboard caches, the CPU 101 accesses the system memory (system memory 103 of FIG. 1) and reads a sequential block of cache line sectors (e.g., sectors of cache lines 1-4), in order to obtain the needed data and the block of data immediately ahead of the needed data.

In a non-sequential access, when the CPU 101 experiences a program execution branch, the CPU fetches a target cache line that typically is not in sequence with a current cache line. For example, the CPU can encounter a program branch instruction within cache line 1 and subsequently fetch cache line 4. An example of a CPU having a cache architecture in accordance with FIG. 3 would be the Pentium 4™ available from Intel Corporation of Santa Clara, Calif.

Figure 4:
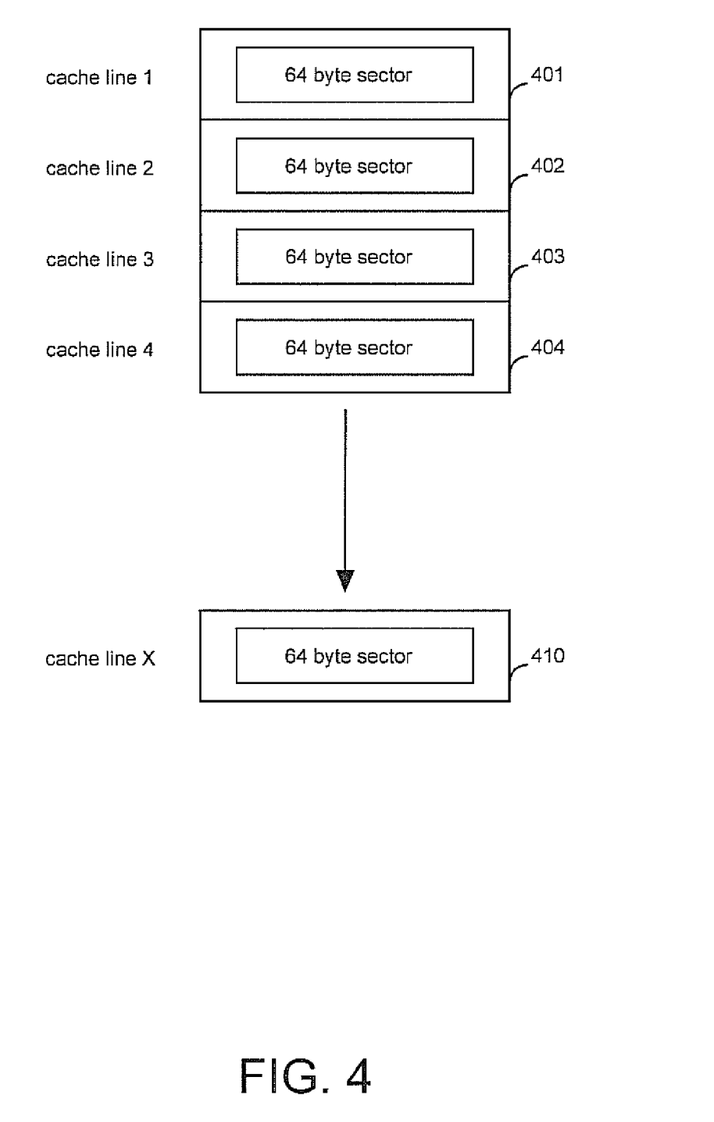
FIG. 4 shows a plurality of cache lines as used by a second CPU in accordance with one embodiment of the present invention.

FIG. 4 shows a plurality of cache lines as used by a second CPU in accordance with one embodiment of the present invention. As depicted in FIG. 4, cache lines 401-410 are shown (e.g., cache line 1 through cache line x). In the second CPU architecture shown in FIG. 4, a cache line comprises a single 64 byte block of data (as opposed to a 128 byte block). As described above in the discussion of FIG. 3, in a sequential access, when the CPU 101 experiences a cache miss, the CPU accesses the system memory and reads a sequential block of cache lines in order to obtain the needed data. In a non-sequential access (e.g. resulting from a branch), the CPU 101 fetches a target cache line that typically is not in sequence with a current cache line. An example of a CPU having a cache architecture in accordance with FIG. 4 would be the Athlon™ available from Advanced Micro Devices of Sunnyvale, Calif. It should be noted that the non-sequential prefetch embodiments of the present invention are equally well-suited for both types of cache architectures.

Figure 5:
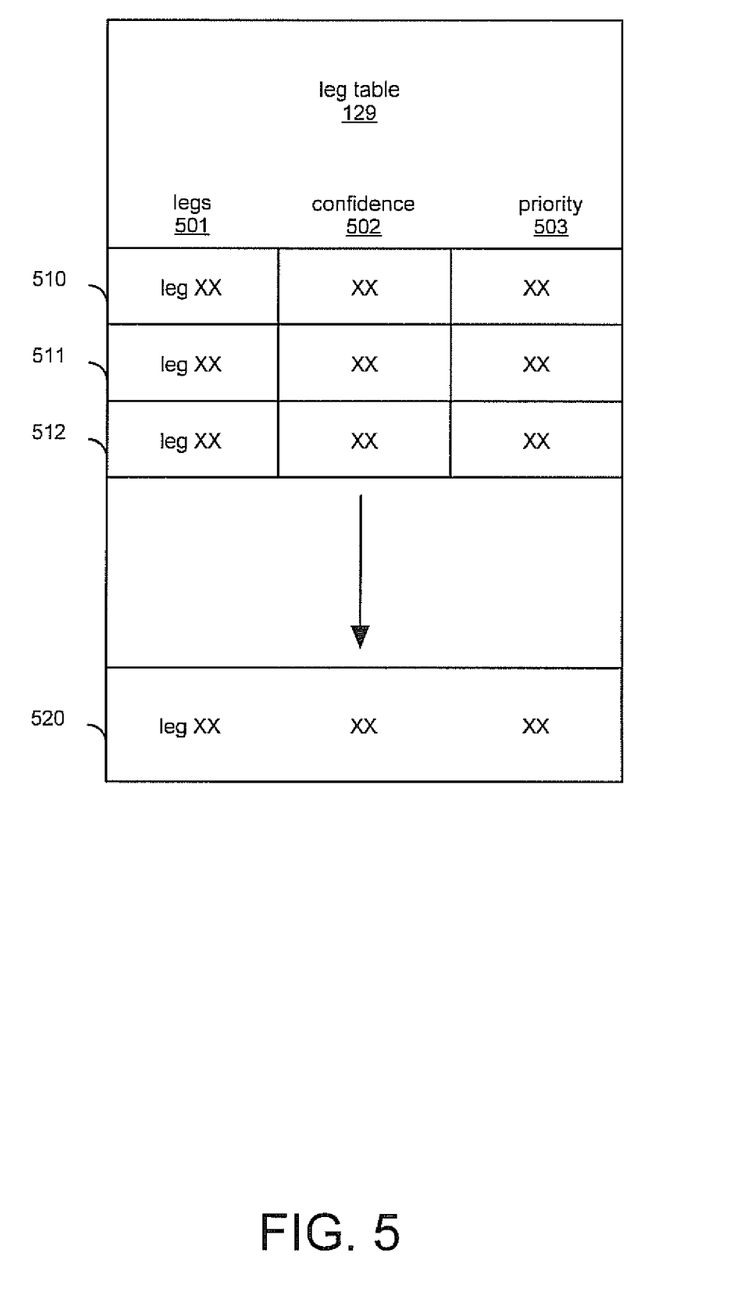
FIG. 5 shows a diagram of a leg table in accordance with one embodiment of the present invention.

FIG. 5 shows a diagram of a leg table 129 in accordance with one embodiment of the present invention. As illustrated in FIG. 5, the leg table 129 includes a plurality of entries, shown in FIG. 5 as the entries 510-512 all the way through entry 520. In one embodiment, the total number of entries within the leg table 129 is related to the overall size of the prefetch cache 130.

In the present embodiment, the entries 510-520, are referred to as legs, and include address pairs characterizing non-sequential cache line fetches of the CPU 101. For example, a leg xx (e.g., leg 510) can include an originating address "a" and a non-sequential destination, or target, address "b." The address pairs are tracked in order to make intelligent predictions as to what destination address cache lines should be prefetched into the prefetch cache 130. The leg table 129 is indexed with the originating address (e.g., the first address) received from the CPU 101. A "hit" returns the destination address (e.g., the second address).

The legs 510-520 of the leg table 129 are prioritized based upon their frequency of use. In the present embodiment, priority is positional, with the highest priority leg at the top and the lowest priority leg at the bottom of the leg table 129. The more often a leg is "hit" by the CPU 101, the higher its priority value 503 is adjusted, and the higher the leg moves in the leg table 129. It should be noted that priority can be strictly positional; it can be a value 503 tracked with each leg, or it can be a combination of the two. When the leg table 129 is full, room can be made for new legs by discarding the lowest priority leg at the bottom.

In one embodiment, the legs 510-520 are also ordered with respect to a confidence value (e.g., confidence 502). In the present embodiment, confidence is adjusted upwards the more often a prefetched destination cache line (e.g., stored within the prefetch cache 130) is actually hit by the CPU 101. In other words, a high confidence leg is a leg that yields a large number of hits on the prefetched destination cache line. The confidence value is used to identify those legs that may experience a large number of hits on the originating address in the leg table 129 (e.g., causing the destination cache line to be prefetched to the prefetch cache 130) but experience comparatively few hits on the prefetched destination cache line. Therefore, the confidence value identifies those legs whose prefetch predictions are usually correct and those legs whose prefetch predictions are usually incorrect. When a confidence value falls below a certain threshold, the given leg can be discarded, for example, to make room for new legs.

Thus, the prefetch cache 130 is loaded in accordance with the predictions indicated by the leg table 129. Those legs having high priority and high confidence are prefetched. Those legs having lower priority and lower confidence are eventually discarded. Over its course of operation, the prefetch cache 130 is continually updated such that its contents are in accordance with the predictions made by the leg table 129.

It should be noted that multiple legs having the same originating address can exist in the table at the same time. In such a case, more than one destination cache line can be prefetched into the prefetch cache 130.

It should be noted that the non-sequential prefetching as implemented by embodiments of the present invention can coexist with other prefetch mechanisms implemented by the CPU 101 or the memory controller 102. For example, the non-sequential prefetching mechanism of the present embodiment can function with different types of sequential look-ahead prefetching or different types of back-sector prefetching. Such prefetched data can be stored within the memory controller 102 (e.g., and a portion of the prefetch cache 130), within the caches of the CPU 101 (e.g., L1 cache or L2 cache), or some other component of the computer system.

Figure 6:
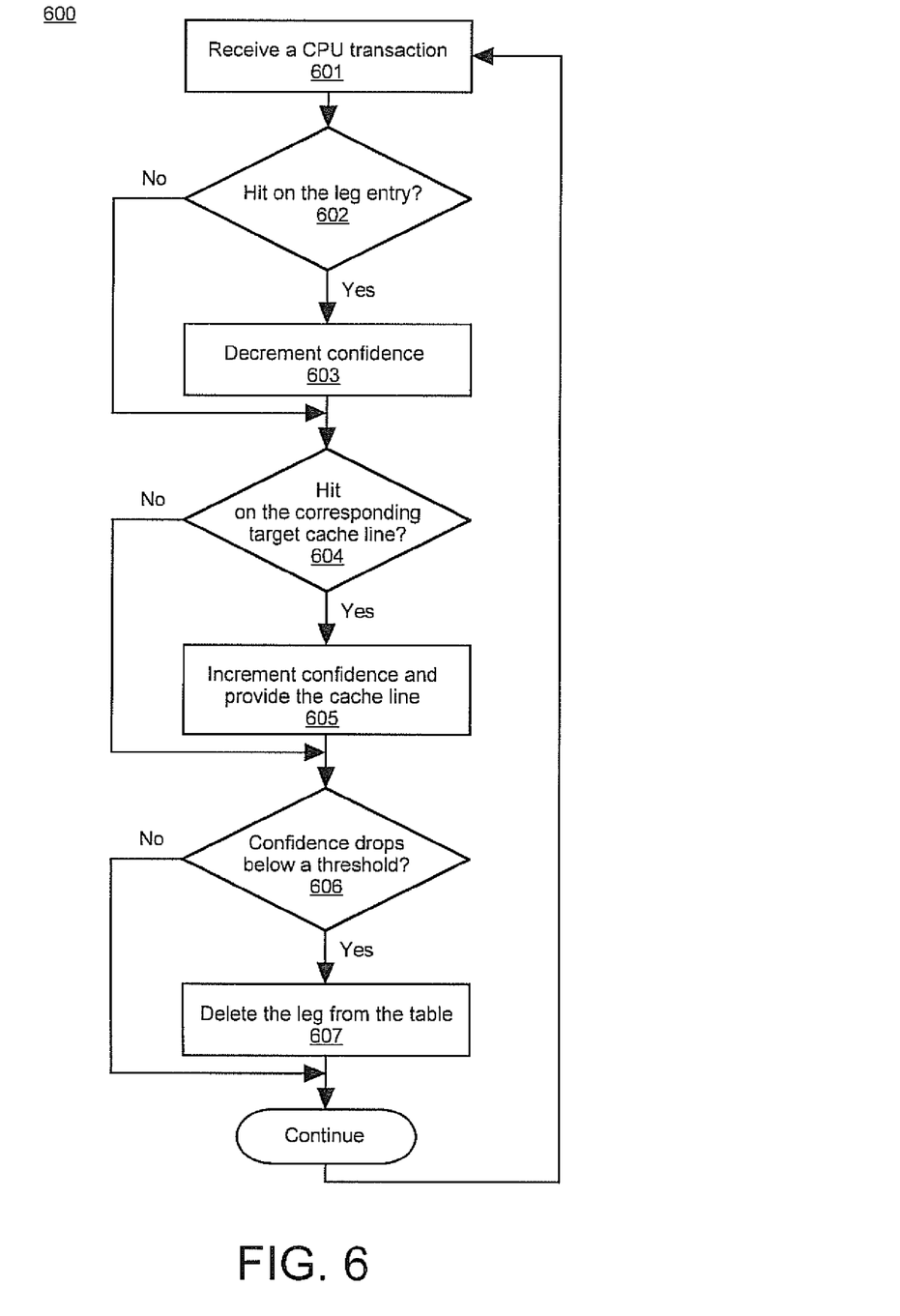
FIG. 6 shows a diagram of a flowchart of steps of a process illustrating the function of the confidence value on the leg table in accordance with one invention.

FIG. 6 shows a diagram of a flowchart of the steps of a process 600 illustrating the function of the confidence value on the leg table 129 in accordance with one invention. As depicted in FIG. 6, the steps of process 600 show the manner in which the confidence value is increased and decreased for the legs of the leg table 129. It should be noted that although FIG. 6 shows one method of adjusting confidence based upon successful predictions, other methods as known by one skilled in the art can be used.

Process 600 begins in step 601 where the memory controller 102 receives a CPU transaction from the CPU 101 across the front side bus 121. As described above, the CPU 101 accesses the system memory 103 via the memory controller 102. The memory controller 102 monitors these accesses and records a plurality of legs (e.g., discontinuous non-sequential address pairs) within the leg table 129. The leg is assigned an initial confidence value and the destination cache line is loaded into the prefetch cache 130.

In step 602, the leg table 129 determines whether the CPU transaction in step 601 results in a hit on a leg entry stored in the leg table 129. As described above, if the CPU transaction received in step 601 has been previously stored as a leg, it will already have an initial confidence value. In step 603, if there is a hit, the initial confidence value is decremented by a certain amount. If there is no hit, process 600 proceeds to step 604. In step 604, the prefetch cache 130 determines whether the destination cache line is hit by the CPU transaction. If there is a hit, then the prediction of the leg was correct, and in step 605, the confidence value for that leg is incremented by a certain amount.

If there is no hit on the prefetched destination cache line, process 600 skips to step 606. In step 606, the confidence value for the cache line is checked to determine whether it has dropped below a confidence threshold. If the confidence has dropped below the threshold, in step 607, the leg is deleted from the leg table 129. If the leg's confidence remains above the threshold, step 607 is skipped, and process 600 continues as indicated by step 608, as new CPU transactions are received.

In this manner, legs that are continuously hit without having their predictions become true (e.g., hits on the prefetched destination cache line) have their confidence value continuously decremented until they are eventually deleted. Legs with a high percentage of successful predictions have their confidence value continuously incremented to reflect their high confidence status.

Figure 7:
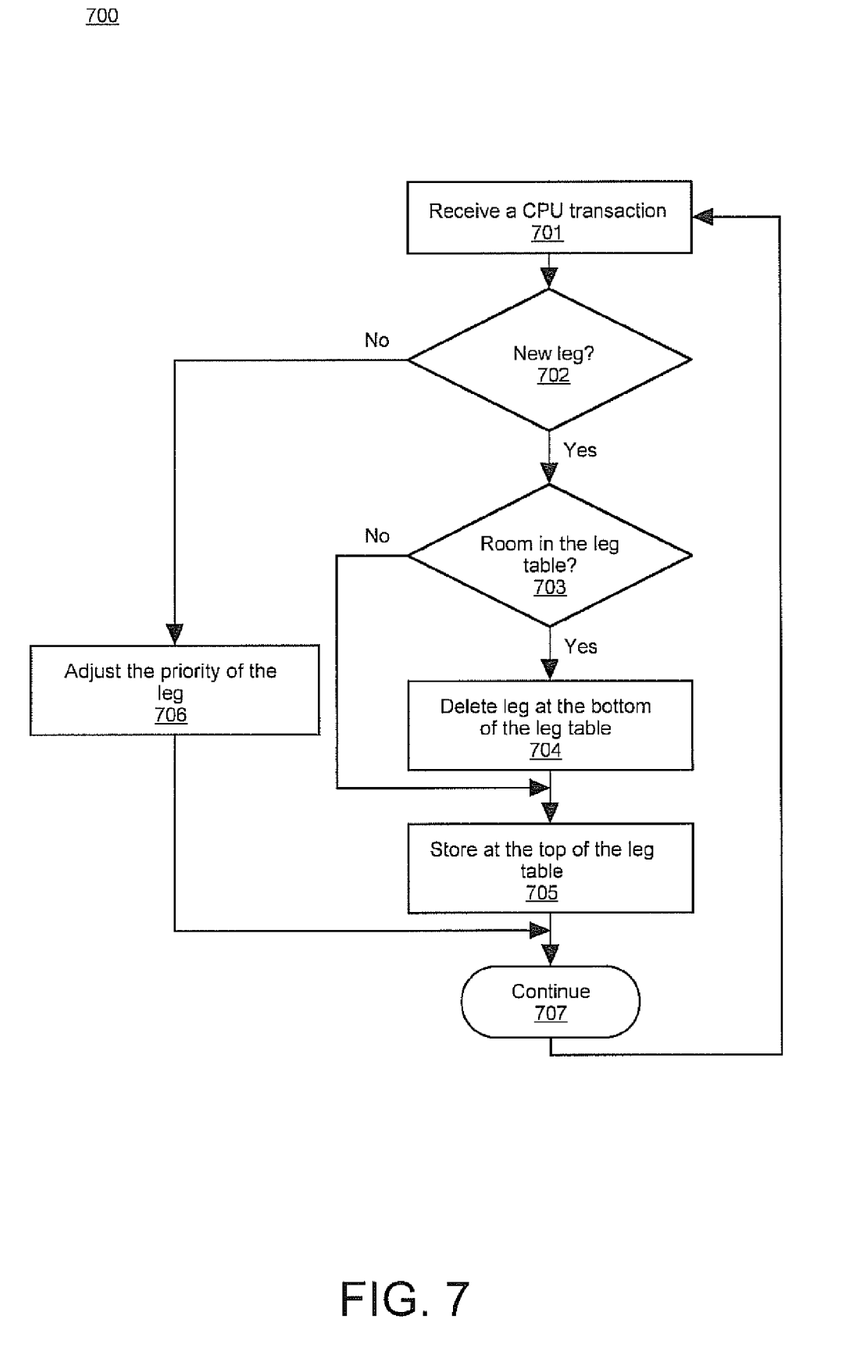
FIG. 7 shows a diagram of a flowchart of steps of a process illustrating the priority function of the leg table in accordance with one embodiment of the present invention.

FIG. 7 shows a diagram of a flowchart of the steps of a process 700, illustrating the priority function of the leg table 129 in accordance with one embodiment of the present invention. As depicted in FIG. 7, the steps of process 700 show the manner in which priority is increased and decreased for the legs of the leg table 129. It should be noted that although FIG. 7 shows one method of adjusting priority based upon hits, other methods as known by one skilled in the art can be used.

Process 700 begins in step 701, where the memory controller 102 receives a CPU transaction from the CPU 101 across the front side bus 121. As described above in the discussion of FIG. 6, the CPU 101 accesses the system memory 103 via the memory controller 102. The memory controller 102 monitors these accesses and records a plurality of legs (e.g., discontinuous non-sequential address pairs) within the leg table 129. In step 702, the memory controller determines whether the CPU transaction received in step 701 is a new leg. If the transaction is not a new leg (e.g., the transaction is a previously stored leg), process 700 proceeds to step 706 where the priority of the leg is adjusted upwards, and process 700 continues as shown by step 707. In step 703, if the transaction represents a new leg, the memory controller 102 determines whether there is room in the leg table 129 to store the new leg. If there is room, process 700 continues to step 705, where the new leg is assigned the highest priority and enters the leg table 129 at the top, and the destination cache line is loaded into the prefetch cache 130.

In step 703, if there is not room in the leg table 129, process 700 proceeds to step 704, where the lowest priority leg at the bottom of leg table is deleted, or otherwise de-allocated. Subsequently, in step 705, the new leg is stored at the top of the leg table 129 and the destination cache line is loaded into the prefetch cache 130. Process 700 subsequently continues as shown in step 707.

In this manner, legs that are continuously hit have their priority increased, such that they move towards the top of the leg table 129 in comparison to legs that have relatively few hits. When space is needed for new legs, lowest priority legs on the bottom of the leg table are deleted, or otherwise deallocated, to make room for the new legs.

Figure 8:
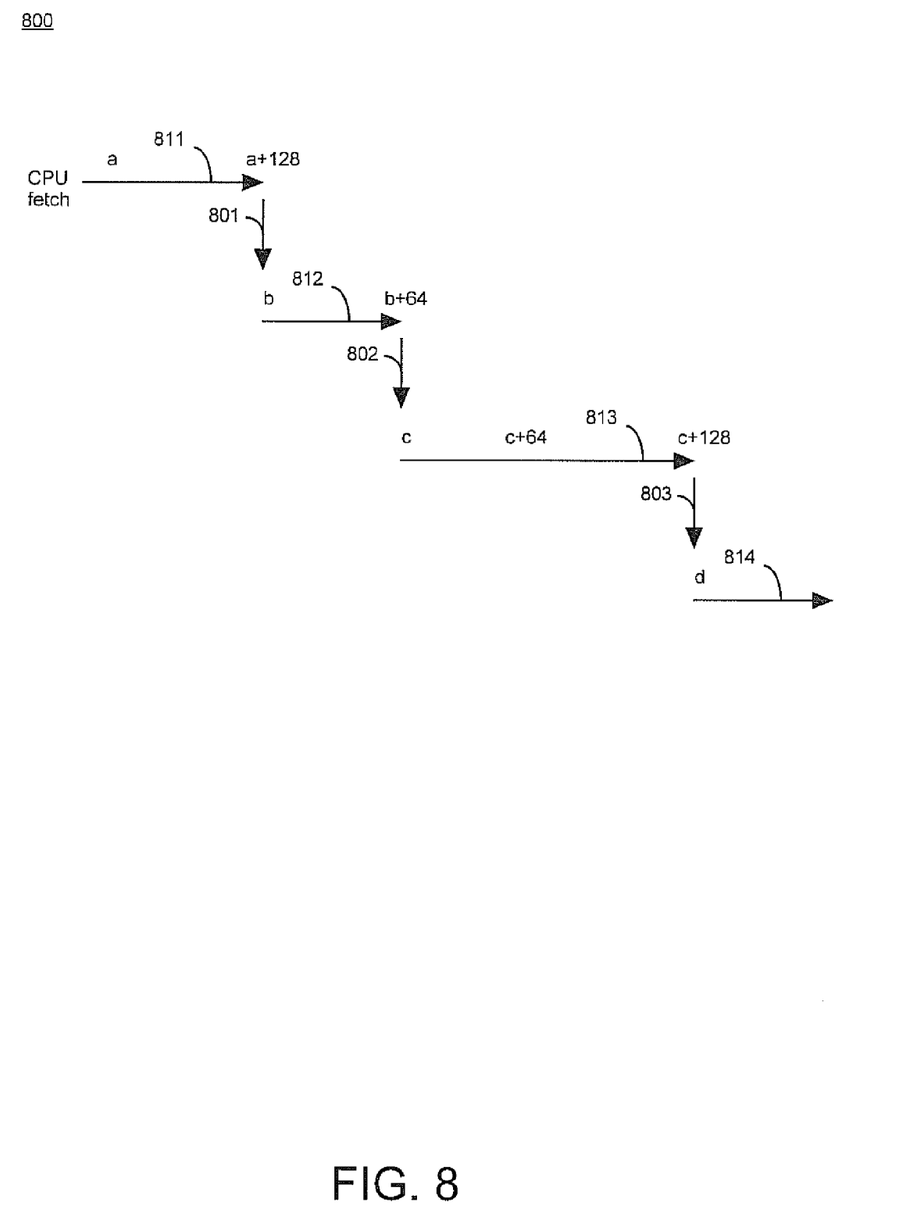
FIG. 8 shows a diagram depicting a CPU fetch pattern as operated on by the non-sequential prefetch embodiments of the present invention.

FIG. 8 shows a diagram depicting a CPU fetch pattern as operated on by the non-sequential prefetch embodiments of the present invention. As depicted in FIG. 8, the diagram 800 shows a CPU fetch proceeding sequentially from address "a" to address "a+128" (e.g., cache lines including these addresses). In this manner, the horizontal lines 811-814 show the sequential prefetches where the CPU 101 proceeds sequentially through the cache lines. The discontinuities resulting from branches, jumps, or the like are shown as the vertical lines 801-803. As described above, these discontinuities are referred to as legs (e.g., legs 801-803). Thus, for example, in the case of leg 801, the originating address (e.g., a or a+128) and the destination address (e.g., b) are stored as a leg in the leg table 129, and the destination cache line (e.g., the cache line including address b) is stored in the prefetch cache 130. On subsequent accesses to the destination cache lines, these cache lines are retrieved from the prefetch cache 130 as opposed to the system memory 103.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for implementing a non-sequential prefetch of data for a processor of a computer system, comprising:
    storing a plurality of address pairs as leg entries in a table data structure of a memory controller that couples to the processor via a front side bus and couples to a system memory via a system memory bus, the address pairs including a first address and a second address, wherein the first address and the second address are non-sequential as fetched by a processor of a computer system due to a branch instruction execution;
    prioritizing the address pairs in accordance with a frequency of use for each of the address pairs;
    accessing system memory and storing a plurality of cache lines corresponding to the address pairs in a prefetch cache; and
    upon a cache hit during a subsequent access by the processor, decrementing a confidence value upon a hit on the corresponding leg entry; and incrementing the confidence value when there is no hit on the corresponding leg entry and a hit on the second address transferring data from the cache lines stored in the prefetch cache to the processor.

2. The method of claim 1 further comprising:
    updating the table data structure by replacing an address pair having a lowest frequency of use with a new address pair in the table data structure.

3. The method of claim 1 further comprising:
    maintaining a confidence value for each of the address pairs in the table data structure, the confidence value indicating the frequency of use for each of the address pairs.

4. The method of claim 3 further comprising:
    decreasing the confidence value for a less frequently used address pair in the table data structure; and
    updating the table data structure by deleting the less frequently used address pair if the confidence value decreases below a confidence threshold.

5. The method of claim 1 further comprising:
    storing new cache lines in the prefetch cache corresponding to new address pairs in the table data structure as the table data structure is updated.

6. A device for implementing a non-sequential prefetch of data for a processor of a computer system, comprising:
    a memory controller for interfacing the processor to a system memory via a system memory bus, wherein the memory controller couples to the processor via a front side bus;
    a prefetch cache included in the memory controller, the prefetch cache configured to access the system memory to retrieve and store a plurality of cache lines; and
    a leg table data structure included in the memory controller, the leg table data structure for storing a plurality of legs, wherein each of the legs includes a first address and a second address non-sequential to the first address due to a branch instruction execution;
    the legs having a priority in accordance with a frequency of use for each of the legs; and
    the legs controlling the storing of the plurality of cache lines in the prefetch cache, such that upon a cache hit during a subsequent access by the processor, decrementing a confidence value upon a hit on the corresponding leg; and incrementing the confidence value when there is no hit on the corresponding leg and a hit on the second address data is transferred from the cache lines stored in the prefetch cache to the processor.

7. The device of claim 6 wherein the prefetch cache is configured to retrieve the cache lines when the system memory bus is not being used by the processor.

8. The device of claim 6 wherein the leg table data structure is configured to be updated by replacing a leg having a lowest frequency of use with a new leg in the leg table data structure.

9. The device of claim 6 further comprising:
    a confidence value stored for each of the legs in the leg table data structure, wherein the confidence value indicates the frequency of use for each of the legs.

10. The device of claim 9 wherein the confidence value is configured to decrease for a less frequently used leg in the leg table data structure, and wherein the leg table data structure is updated by deleting the less frequently used leg if the respective confidence value decreases below a confidence threshold.

11. The device of claim 6 wherein the prefetch cache is configured to store new cache lines corresponding to new legs in the leg table data structure as the leg table data structure is updated.

12. The device of claim 6 wherein the prefetch cache is configured to delete cache lines from the prefetch cache on a least recently used basis.

13. The device of claim 6 wherein the prefetch cache is configured to delete cache lines from the prefetch cache on a first in first out basis.

14. The device of claim 6 wherein the cache lines are 64-bit cache lines.

15. The device of claim 6 wherein the cache lines are 128-bit cache lines.

16. The device of claim 6 wherein the prefetch cache is larger than 2 KB.

17. A system for implementing non-sequential data prefetching for a processor of a computer system, comprising:
- a processor;
- a system memory;
- a prefetch cache configured to access the system memory to retrieve and store a plurality of cache lines, wherein the prefetch cache couples to the processor via a front side bus and couples to the system memory via a system memory bus; and
- a memory controller coupled to the prefetch cache, the processor and the system memory, the memory controller for interfacing the processor to the system memory and implementing a method for non-sequential prefetching, comprising:
  - storing a plurality of legs in a leg table data structure, the legs including a first address and a second address, wherein the first address and the second address are non-sequential as fetched by a processor of a computer system due to a branch instruction execution;
  - prioritizing the legs in accordance with a frequency of use for each of the legs;
  - accessing system memory and storing a plurality of cache lines corresponding to the legs in a prefetch cache; and
  - upon a cache hit during a subsequent access by the processor, decrementing a confidence value upon a hit on the corresponding leg; and incrementing the confidence value when there is no hit on the corresponding leg and a hit on the second address transferring data from the cache lines stored in the prefetch cache to the processor.

18. The system of claim 17 further comprising:
- updating the leg table data structure by replacing a leg having a lowest frequency of use with a new leg in the leg table data structure.

19. The system of claim 17 further comprising:
- maintaining a confidence value for each of the legs in the leg table data structure, the confidence value indicating the frequency of use for each of the legs.

20. The system of claim 19 further comprising:
- decreasing the confidence value for a less frequently used leg in the leg table data structure; and
- updating the leg table data structure by deleting the less frequently used leg if the confidence value decreases below a confidence threshold.

21. The system of claim 17 further comprising:
- storing new cache lines in the prefetch cache corresponding to new legs in the leg table data structure as the leg table data structure is updated.

22. The system of claim 17 wherein the plurality of legs in the leg table data structure include a first address and a second address, and wherein the first address is used to index the leg table data structure and the second address is used to prefetch a corresponding cache line to the prefetch cache.

* * * * *